US008561937B2

(12) United States Patent
Goodarzi

(10) Patent No.: US 8,561,937 B2
(45) Date of Patent: Oct. 22, 2013

(54) UNMANNED AERIAL VEHICLE

(76) Inventor: Hosein Goodarzi, Tehran (IR)

( * ) Notice: Subject to any disclaimer, the term of this patent is extended or adjusted under 35 U.S.C. 154(b) by 403 days.

(21) Appl. No.: 12/906,096

(22) Filed: Oct. 17, 2010

(65) Prior Publication Data

US 2012/0091284 A1    Apr. 19, 2012

(51) Int. Cl.
*B64C 27/00* (2006.01)
*B64C 29/00* (2006.01)

(52) U.S. Cl.
USPC .................. 244/17.19; 244/23 C; 446/36

(58) Field of Classification Search
USPC ...... 244/12.1, 12.2, 17.11, 17.19, 23 R, 23 A, 244/23 C; 446/35–38, 46
See application file for complete search history.

(56) References Cited

U.S. PATENT DOCUMENTS

| | | | | |
|---|---|---|---|---|
| D171,509 S * | 2/1954 | Lightbourn | .................. | D12/325 |
| 2,996,266 A * | 8/1961 | Rebasti | ........................ | 244/12.2 |
| 2,996,269 A * | 8/1961 | Parry | ........................ | 244/17.19 |
| 2,997,254 A * | 8/1961 | Mulgrave et al. | ............ | 244/12.2 |
| 3,640,489 A * | 2/1972 | Jaeger | ........................ | 244/23 C |
| 3,697,020 A * | 10/1972 | Thompson | .................. | 244/12.2 |
| 3,852,910 A * | 12/1974 | Everett | ............................ | 446/46 |
| 4,433,819 A * | 2/1984 | Carrington | .................... | 244/12.2 |
| 4,606,515 A * | 8/1986 | Hickey | ............................ | 244/29 |
| 6,375,117 B1 * | 4/2002 | Cain | ........................... | 244/23 R |
| 6,666,404 B1 * | 12/2003 | Wingert et al. | ............ | 244/17.19 |
| 6,899,586 B2 * | 5/2005 | Davis | ............................ | 446/37 |
| 7,255,623 B2 * | 8/2007 | Davis | ............................. | 446/36 |
| 7,497,759 B1 * | 3/2009 | Davis | ............................. | 446/454 |
| 7,794,302 B2 * | 9/2010 | Davis | ............................. | 446/454 |
| 7,971,823 B2 * | 7/2011 | Martin | ........................ | 244/23 C |
| 8,322,649 B2 * | 12/2012 | Martin | ........................ | 244/23 C |
| 2010/0282918 A1 * | 11/2010 | Martin | ........................... | 244/23 |
| 2010/0320333 A1 * | 12/2010 | Martin | ........................ | 244/23 A |

* cited by examiner

*Primary Examiner* — Joseph W Sanderson
(74) *Attorney, Agent, or Firm* — Barry Choobin; Patent 360 LLC

(57) ABSTRACT

The various embodiments of the present invention provide an unmanned aerial vehicle comprising a hemispherical body, a brushless type electrical, a propeller, a plurality of wingtip devices, a plurality of servo motors and each of the plurality of the servo motors is connected to each of the plurality of the wingtip devices respectively, a plurality of carbon rods, and a casing. The brushless type electrical motor provides a lifting force for a vertical take-off and landing (VTOL) and the plurality of wing tip devices are classified into three types of wing tip devices and the three types of wing tip devices are controlled by the respective servo motors to control yaw, pitch and roll movements thereby stabilizing and controlling the movement of an aircraft.

19 Claims, 13 Drawing Sheets

UNMANNED AERIAL VEHICLE

SPONSORSHIP STATEMENT

The present invention is sponsored by Iranian National Science Foundation.

BACKGROUND

1. Technical Field

The embodiments herein generally relate to aerial vehicles and particularly to unmanned aerial vehicles. The embodiments herein more particularly relate to an unmanned aerial vehicle with a vertical takeoff and landing (VTOL) facility provided with a control mechanism to achieve a very good balance in static flights and cruise.

2. Description of the Related Art

Currently, the unmanned aerial vehicles are widely used in different countries due to the relatively low costs because of their design and construction in comparison to the normal aircrafts. Further the air force missions and many civilian air missions are performed using the unmanned aerial vehicles.

When the area of ailerons or flaps and their torque arm have not been appropriately designed up to the center of gravity in a convertiplane, then the steerage of the convertible craft may be decreased which in turn leads to a reduction in control performance. In the existing aerial vehicles, the angle may not be sufficiently altered in the steering flaps so that the flaps are not able to provide the needed drag force for the production of torsion torque about the center of gravity which in turn leads to a decrease in a steering power of the convertiplane.

Further in the existing technique, the servo motors may not be arranged in the control circuit correctly and as a result the movement of the aircraft may not be controlled. In the current scenario, the hemispherical body and flaps in the unmanned aerial vehicle produces a drag force against the propeller lower airflow. The force acts collinearly and causes a dissipation of motor power which in turn decreases the flying time of the unmanned aerial vehicle.

Hence there is a need for controlling the movement of the aircraft in different directions thereby providing a balance and stability to the aircraft during a flight.

The abovementioned shortcomings, disadvantages and problems are addressed herein and which will be understood by reading and studying the following specification.

OBJECTS OF THE EMBODIMENTS

The primary object of the embodiments herein is to develop an unmanned aerial vehicle with an aerodynamic design of a hemispherical body and a plurality of wingtip devices for controlling the movement of an aircraft in different directions to achieve stability in a flight or a cruise.

Another object of the embodiments herein is to develop an unmanned aerial vehicle with an aerodynamic structure of a hemispherical body and a plurality of wingtip devices for providing stability to the aircraft during landing and takeoff.

Yet another object of the embodiments herein is to develop an unmanned aerial vehicle that is capable of performing a vertical take-off and landing operations.

Yet another object of the embodiments herein is to develop an unmanned aerial vehicle for predetermined special missions to places to which a human inspection/visit is not possible.

Yet another object of the embodiments herein is to develop an unmanned aerial vehicle with an electrical motor for producing a propulsive force for the aircraft and to decrease the amount of noise generated from the electromotor.

Yet another object of the embodiments herein is to develop an unmanned aerial vehicle for reconnaissance and surveillance purposes.

Yet another object of the embodiments herein is to develop an unmanned aerial vehicle with the brushless type electrical motor for providing a lifting force for a vertical take-off and landing (VTOL).

Yet another object of the embodiments herein is to develop an unmanned aerial vehicle with the plurality of wing tip devices that are classified into three types of wing tip devices and are controlled by the respective servo motors to control yaw, pitch and roll movements.

Yet another object of the embodiments herein is to develop an unmanned aerial vehicle in which the movement of an aircraft is stabilized and controlled.

Yet another object of the embodiments herein is to develop an unmanned aerial vehicle with a control system to adjust a movement of the plurality of wingtip devices based on symmetry of configuration.

Yet another object of the embodiments herein is to develop an unmanned aerial vehicle with a piezoelectric gyroscope for giving a deflection command to the servo motors with a priority which is higher than a priority assigned to a command received from the user for changing the movement of the aircraft.

Yet another object of the embodiments herein to develop an unmanned aerial vehicle with a plurality of the wingtip devices installed around the hemispherical body to regulate and channelize a turbulent downward air flow due to a spinning propeller and to prevent generation of an empty space below the air craft due to the induction of energetic vortices of a propeller thereby increasing the stability of the aircraft.

These and other objects and advantages of the embodiments herein will become readily apparent from the following detailed description taken in conjunction with the accompanying drawings.

SUMMARY

The various embodiments herein provide an unmanned aerial vehicle that includes a hemispherical body and a brushless type electrical motor is mounted on top of the hemispherical body. A propeller is attached to the brushless type electrical motor. A plurality of wingtip devices is arranged around the hemispherical body. A plurality of servo motors is connected to the plurality of the wingtip devices respectively. Each of the plurality of the servo motors is connected to each of the plurality of the wingtip devices respectively. A plurality of carbon rods is attached to the hemispherical body to protect the plurality of the wingtip devices from damage during a takeoff and a landing operation. A casing is arranged inside the hemispherical body to accommodate a control system, a surveillance unit, a radio receiver, a battery unit for the radio receiver, a lithium polymer battery, a piezoelectric gyroscope, a rotation speed control motor and a battery for the surveillance unit.

The brushless type electrical motor provides a lifting force for a vertical take-off and landing (VTOL). The plurality of wing tip devices are classified into three types of wing tip devices. The three types of wing tip devices are controlled by the respective servomotors to control yaw, pitch and roll movements thereby stabilizing and controlling the movement of an aircraft.

According to one embodiment herein, the three types of the wingtip devices are a first wing type devices, a second wing type devices and a third wing type devices. The first wing type devices control a movement of the aircraft in the yaw direction, the second wing type devices control a movement of the aircraft in the roll direction and the third wing type devices control a movement of the aircraft in the pitch direction.

According to one embodiment herein, the control system regulate an operation of the plurality of the servo motors to change an angle of the plurality of the wingtip devices against a downward air flow of the propeller to adjust the yaw, pitch and roll movements to stabilize and control the movement of the aircraft. The control system is operated based on symmetry of configuration and a movement of the plurality of wingtip devices.

According to one embodiment herein, the piezoelectric gyroscope provides a deflection command to the servo motors.

According to one embodiment herein, the unmanned aerial vehicle includes a sensor located in the casing to receive an input from a user to output the commands to the control system to regulate the operation of the servo motors to adjust the movement of the plurality of the wing tip devices to control the yaw, pitch and roll movements of the aircraft.

According to one embodiment herein, the user transmits a command to the sensor for controlling the movement of the aircraft in different directions using the radio transmitter. The command is related to a change of angle against the downward air flow movement of the propeller.

According to one embodiment herein, the servo motors controls the angle between the plurality of wingtip devices and the downward air flow of the propeller.

According to one embodiment herein, the electromotor directs the aircraft to an appropriate height by decreasing or increasing a rotation speed (in rpm) of the electromotor.

According to one embodiment herein, the surveillance unit is a visual surveillance camera.

According to one embodiment herein, the casing of the unmanned aerial vehicle includes a video transmitter and an antenna and a global positioning system.

According to one embodiment herein, the piezoelectric gyroscope gives the deflection command to servomotors with a priority which is higher than a priority assigned to a command received from the user for changing the movement of the aircraft.

According to one embodiment herein, the three types of wing tip devices have a plurality of wingtip devices arranged symmetrically with respect to a central axis of the hemispherical body.

According to one embodiment herein, the control system regulates the operation of the servo motors to adjust the rotation of the plurality of the wing tip devices in each of the three types of the wing tip devices so that the symmetrically arranged plurality of the wing tip devices in each of the three types of the wing tip devices are rotated in mutually opposite directions to equalize a torque of the brushless type electrical motor to stabilize a movement of the aircraft in a Z-axis.

According to one embodiment herein, a curve of the hemispherical body is designed in a way to keep a balance and a stability of the aircraft to provide a flight with more stable dynamics.

According to one embodiment herein, the plurality of the wingtip devices are installed around the hemispherical body to regulate and channelize a turbulent downward air flow due to a spinning propeller and to prevent an empty space below the aircraft due to the induction of energetic vortices of a propeller thereby increasing the stability of the aircraft.

According to one embodiment herein, the plurality of the wingtip devices and the hemispherical body provide an aerodynamic combination to increase a dynamic stability of the aircraft during a calm air of environment as well as during the landing and take-off operations and in static conditions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
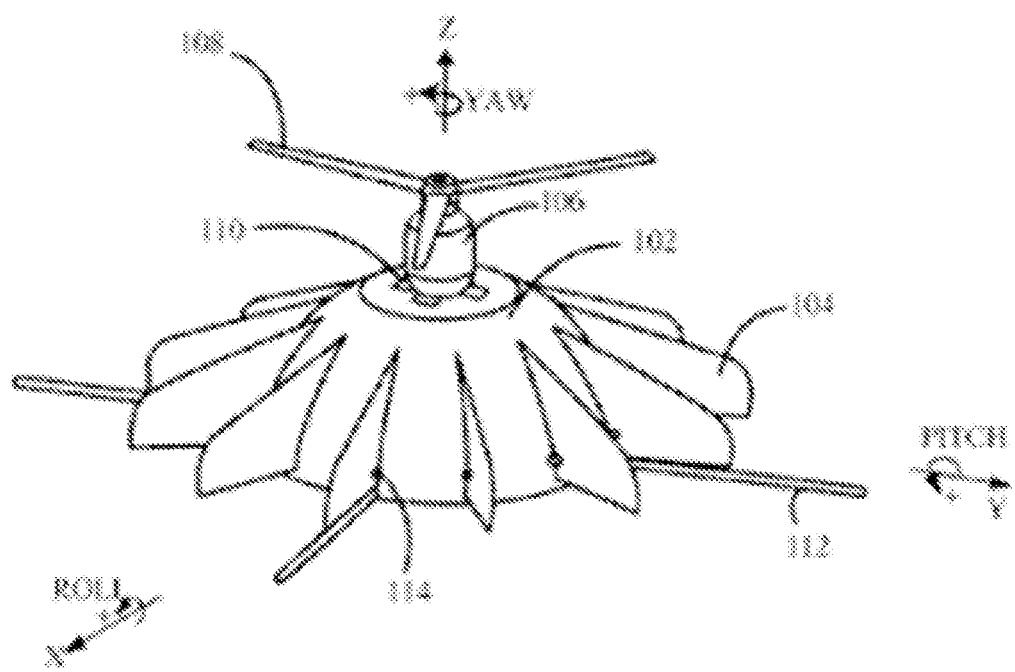
FIG. 1 illustrates a top side perspective view of an unmanned aerial vehicle with an engine and a propeller, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof and in which the specific embodiments that may be practiced is shown by way of illustration. These embodiments herein are described in sufficient detail to enable those skilled in the art to practice the embodiments herein with and without modifications and it is to be understood that the logical, mechanical and other changes may be made without departing from the scope of the embodiments. The following detailed description is therefore not to be taken in a limiting sense.

The various embodiments herein provide an unmanned aerial vehicle with a hemispherical body and a brushless type electrical motor is mounted on top of the hemispherical body. A propeller is attached to the brushless type electrical motor. A plurality of wingtip devices is arranged around the hemispherical body. A plurality of servo motors is connected to the plurality of the wingtip devices respectively and wherein each of the plurality of the servo motors is connected to each of the plurality of the wingtip devices respectively. A plurality of carbon rods is attached to the hemispherical body to protect the plurality of the wingtip devices from damage during a take-off and a landing operation. A casing is arranged inside the hemispherical body to accommodate a control system, a surveillance unit, a radio receiver, a battery unit for the radio receiver, a lithium polymer battery, a piezoelectric gyroscope, a rotation speed control motor and a battery for the surveillance unit. The brushless type electrical motor provides a lifting force for a vertical take-off and landing (VTOL). The plurality of the wing tip devices are classified into three types of wing tip devices and the three types of wing tip devices are controlled by the respective servo motors to control yaw, pitch and roll movements thereby stabilizing and controlling the movement of an aircraft.

According to one embodiment herein, the three types of the wingtip devices are a first wing type devices, a second wing type devices and a third wing type devices. The first wing type devices control a movement of the aircraft in the yaw direction. The second wing type devices control a movement of the aircraft in the roll direction and the third wing type devices control a movement of the aircraft in the pitch direction.

According to one embodiment herein, the control system regulates an operation of the plurality of the servo motors to change an angle of the plurality of the wingtip devices against a downward air flow of the propeller to adjust the yaw, pitch and roll movements to stabilize and control the movement of the aircraft. The control system is operated based on a symmetry of configuration and a movement of the plurality of wingtip devices.

According to one embodiment herein, the unmanned aerial vehicle includes a sensor located in the casing to receive an input from a user to output the commands to the control system to regulate the operation of the servo motors to adjust the movement of the plurality of the wing tip devices to control the yaw, pitch and roll movements of the aircraft. The user transmits a command to the sensor for controlling the movement of the aircraft in different directions using the radio transmitter. The command is related to a change of an angle of the wing tip device against the downward air flow movement of the propeller.

According to one embodiment herein, the servo motors control the angle between the plurality of wingtip devices and the downward air flow of the propeller.

According to one embodiment herein, the electromotor directs the aircraft to an appropriate height by decreasing or increasing a rotation speed (in rpm) of the electromotor.

According to one embodiment herein, the surveillance unit is a visual surveillance camera.

According to one embodiment herein, the casing of the unmanned aerial vehicle includes a video transmitter, an antenna and a global positioning system.

According to one embodiment herein, the piezoelectric gyroscope provides a deflection command to the servo motors. The piezoelectric gyroscope gives a deflection command to servomotors with a priority which is higher than a priority assigned to a command received from the user for changing the movement of the aircraft.

According to one embodiment herein, the three types of wing tip devices have a plurality of wingtip devices arranged symmetrically with respect to a central axis of the hemispherical body.

According to one embodiment herein, the control system regulates the operation of the servo motors to adjust the rotation of the plurality of the wing tip devices in each of the three types of the wing tip devices so that the symmetrically arranged plurality of the wing tip devices in each of the three types of the wing tip devices are rotated in mutually opposite directions to equalize a torque of the brushless type electrical motor to stabilize a movement of the aircraft in a Z-axis.

According to one embodiment herein, a curve of the hemispherical body is designed in a way to keep a balance and a stability of the aircraft to provide a flight with more stable dynamics. The plurality of the wingtip devices are installed around the hemispherical body to regulate and channelize a turbulent downward air flow due to a spinning propeller and to prevent a generation of an empty space below the aircraft due to an induction of energetic vortices of propeller thereby increasing the stability of the aircraft.

According to one embodiment herein, the plurality of the wingtip devices and the hemispherical body provide an aerodynamic combination to increase a dynamic stability of the aircraft during a calm air of environment as well as during the landing and takeoff operations and in static conditions.

FIG. 1 illustrates a top side perspective view of an unmanned aerial vehicle with an engine and a propeller to fly vertically, according to one embodiment. With respect to FIG. 1, the unmanned aerial vehicle includes a hemispherical body 102, a plurality of wingtip devices 104, a brushless type electrical motor 106, a propeller 108, a base of the brushless type electrical motor 110, a plurality of carbon rods 112 and a connector shaft 114.

The brushless type electrical motor 106 is mounted on top of the hemispherical body 102 and the propeller 108 is attached to the brushless type electrical motor 106. The plurality of wingtip devices 104 are arranged around the hemispherical body 102. The plurality of carbon rods 112 is attached to the hemispherical body 102 to protect the plurality of the wingtip devices 104 from damage during a take-off and a landing operation. The hemispherical body 102 is made of composite fibers. The propeller 108 is a 3-blades propeller.

Figure 2:
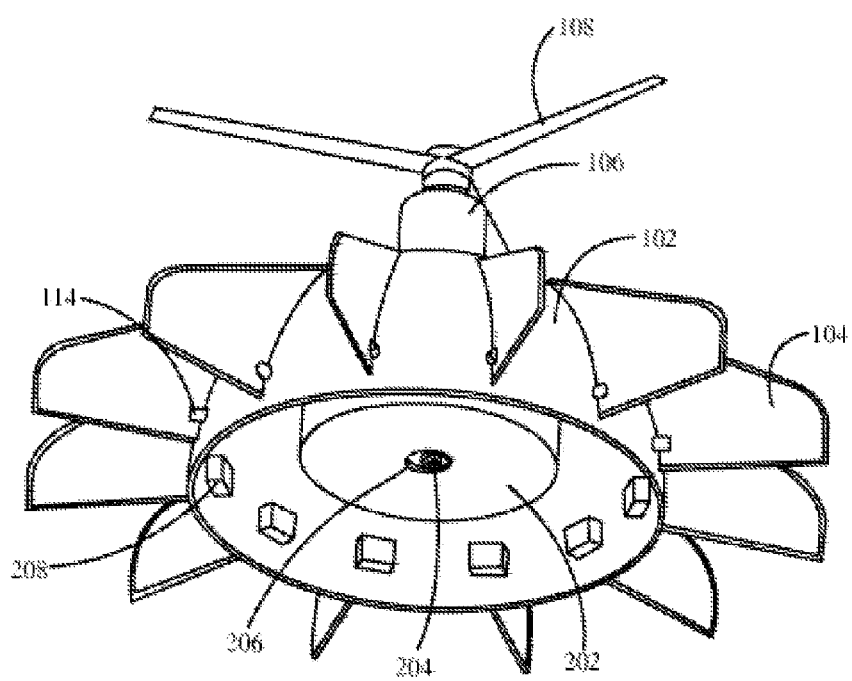
FIG. 2 illustrates a bottom side perspective view of unmanned aerial vehicle with a casing installed inside the hemispherical body, according to one embodiment herein.

FIG. 2 illustrates a perspective view of vertical take-off and landing of the unmanned aerial vehicle with a casing installed inside the hemispherical body 102, according to one embodiment. With respect to FIG. 2, the unmanned aerial vehicle includes one or more doors 202, a protective lens 204, a valve 206 and a plurality of servomotors 208.

Each of the wingtip devices of the plurality of wingtip devices 104 is connected to a servo motor 208 using a connector shaft 114. The servo motors 208 changes the wingtip angle against the downward air flow of the propeller 108 and creates an arbitrary and regulated aerodynamic forces.

The plurality of servo motors 208 is connected to the plurality of the wingtip devices 104 respectively and each of the plurality of the servo motors 208 is connected to each of the plurality of the wingtip devices 104 respectively. The brushless type electrical motor 106 provides a lifting force for a vertical take-off and landing (VTOL) and the plurality of wing tip devices 104 are classified into three types of wing tip devices and the three types of wing tip devices are controlled by the respective servomotors 208 to control yaw, pitch and roll movements.

Figure 3:
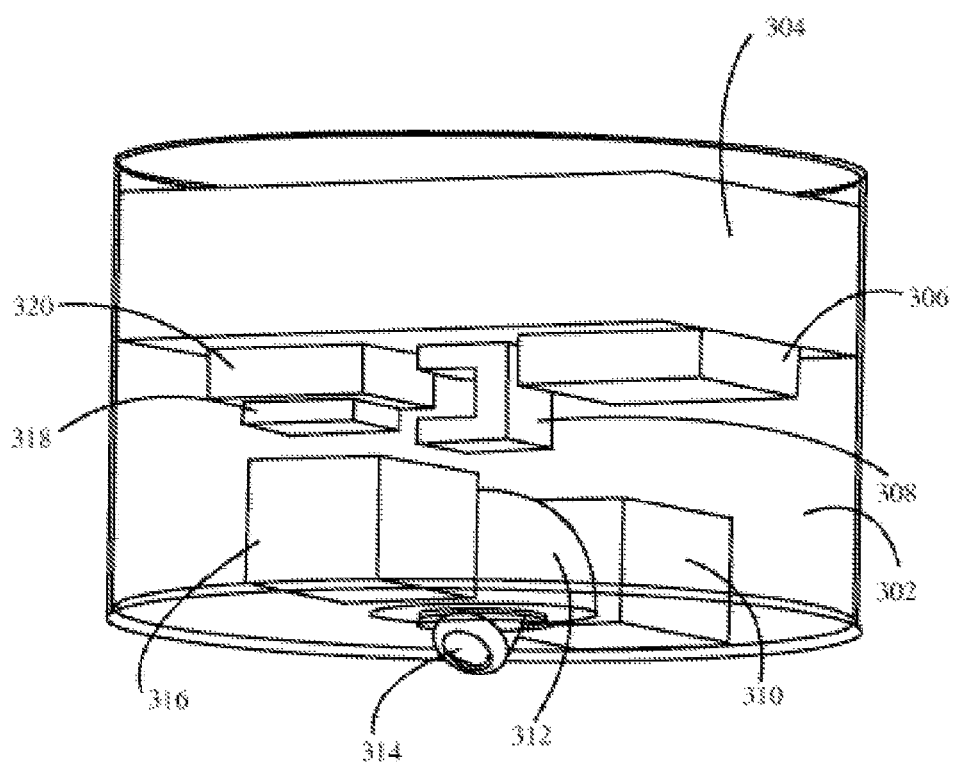
FIG. 3 illustrates a front side perspective view of the casing in an unmanned aerial vehicle, according to one embodiment herein.

FIG. 3 illustrates a front side perspective view of a casing in the unmanned aerial vehicle, according to one embodiment. With respect to FIG. 3, the casing 302 includes a lithium polymer battery 304, a rotation speed control motor 306, a piezoelectric gyroscope 308, a battery 310, a supply 312, a surveillance unit 314, a control circuit of directional servo motors 316, a battery unit 318 for a radio receiver 320.

The casing 302 is connected to the hemispherical body by fixing the casing 302 from inside to the base of the electromotor through one or more screws and nuts. The piezoelectric gyroscope 308 is widely used in radio-controlled helicopters and radio-controlled airplanes for controlling the helicopter's tail rotor and to keep the tail of the airplane steady during take-off or landing.

A sensor is located in the casing 302 to receive an input from a user to output the commands to the control system to regulate the operation of the servo motors 208 to adjust the movement of the plurality of the wing tip devices 104 to control the yaw, pitch and roll movements of the aircraft.

The piezoelectric gyroscope 308 used in the unmanned aerial vehicle is the one that is used in a hobby unmanned helicopter. The piezoelectric gyroscope 308 gives a deflection command to the control circuit of directional servo motors 316 with a priority which is higher than a priority assigned to a command received from the user for changing the movement of the aircraft. The user transmits a command to the sensor for controlling the movement of the aircraft in different directions using the radio transmitter. The command is related to a change of angle against the downward air flow movement of the propeller 108.

The surveillance unit 314 used in the unmanned aerial vehicle is a visual surveillance camera. The casing 302 also includes a global positioning system, a video transmitter and an antenna.

Figure 4:
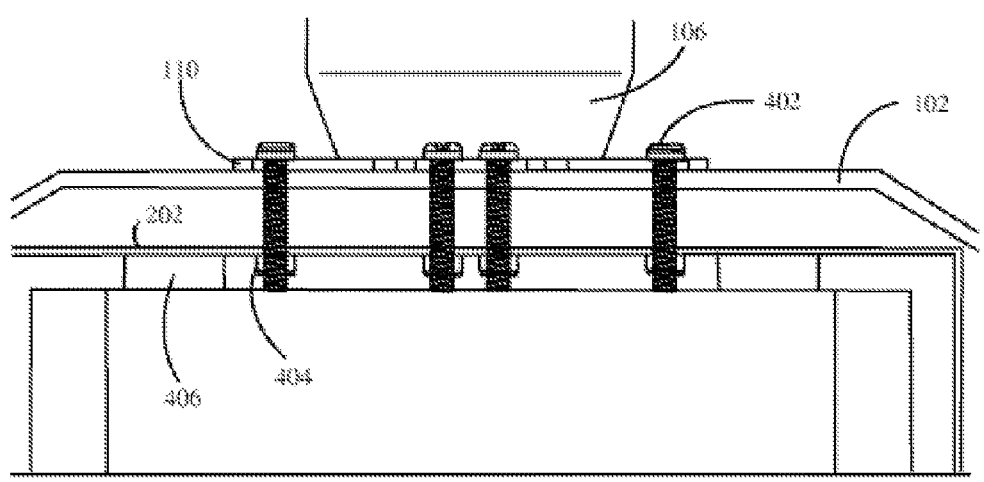
FIG. 4 illustrates a front side view of an equipment and a casing connected to the hemispherical body and the brushless type electromotor in an unmanned aerial vehicle, according to one embodiment herein.

FIG. 4 illustrates a perspective view of an electronic equipment and a casing connected to the hemispherical body and the brushless type electromotor, according to one embodiment. With respect to FIG. 4, a plastic or a wooden base 406 is located between a roof of the casing and the battery for creating a distance between the battery and the one or more screws 402. Further one or more nuts 404 are used for fitting the doors 202 on the wooden base 406. The brushless type electromotor 106 is mounted on the base of the electromotor 110.

Figure 5:
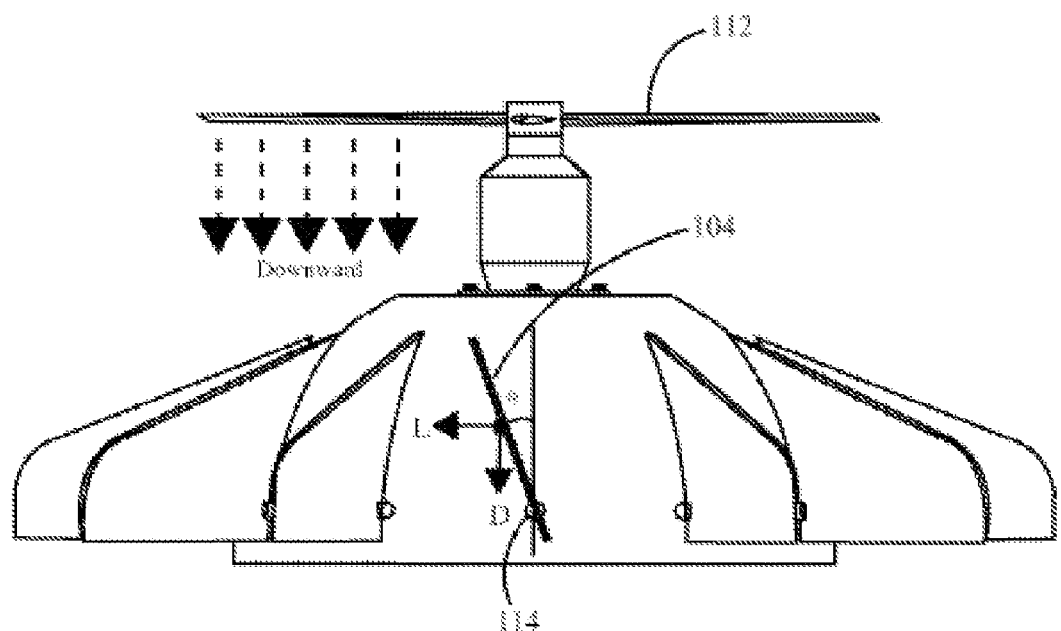
FIG. 5 illustrates a front side view of an unmanned aerial vehicle mounted with a plurality of wing tip devices which are rotated around the servo motor axis through an angle related to a mode of change of wingtip, according to one embodiment herein.

FIG. 5 illustrates a perspective view of a wingtip device rotated around the servo motor axis and an angle related to mode change of wingtip device, according to one embodiment. With respect to FIG. 5, the plurality of wingtip devices 104 connected around the hemispherical body 102 produce an aerodynamic drag (D) and lift (L) force, when the propeller 108 air flows downward passing through the plurality of wingtip devices 104. The downward flow of air results in changing the angle (8) of the wingtip devices 104. The movement of the unmanned aerial vehicle is controlled by the aerodynamic drag (D) and lift (L) force.

The control system regulate an operation of the plurality of the servo motors to changes the angle of the plurality of the wingtip devices 104 against a downward air flow of the propeller to adjust the yaw, pitch and roll movements to stabilize and control the movement of the aircraft. The control system is operated based on symmetry of configuration and a movement of the plurality of wingtip devices 104.

Figure 6:
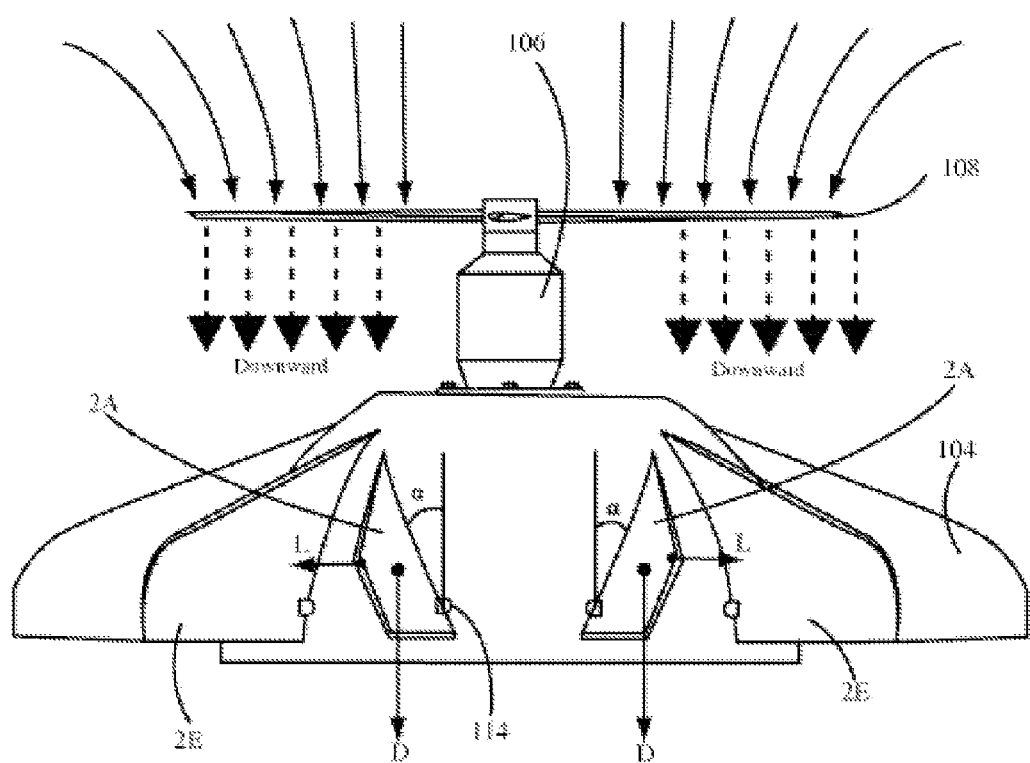
FIG. 6 illustrates a front side view of an unmanned aerial vehicle according to one embodiment herein, indicating the deflection of the wing tip devices towards Y axis.
Figure 7:
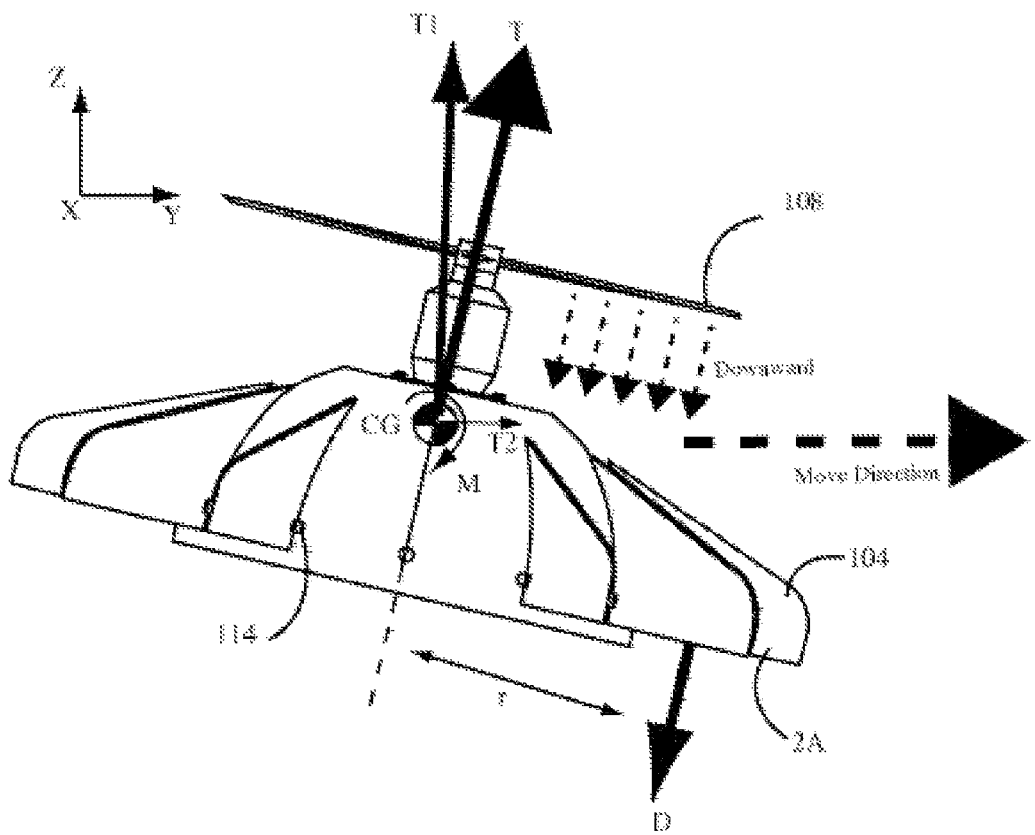
FIG. 7 illustrates a front side view of an unmanned aerial vehicle according to one embodiment herein, indicating a torque caused by the forces generated from a control wingtip around the center of gravity of the unmanned aerial vehicle.

FIG. 6 illustrates a perspective view of the plurality of wingtip devices in the unmanned aerial vehicle for controlling in Z axis or perform yaw maneuver, according to one embodiment, while FIG. 7 illustrates a perspective view of the plurality of wingtip devices in the unmanned aerial vehicle for controlling in X axis or pitch maneuver control and Y axis or roll maneuver control, according to one embodiment. With respect to FIG. 6, a drag force D is used for the torque M1 due to deflection in angle ($\alpha$) of 2A wingtip against downward flow of air from the propeller 108. Further changing the angle ($\alpha$) of 2A wingtip in a rate leads to create a lifting force L for each 2A wingtips which in turn neutralizes the torque.

The deflection command is sent by the user for the movement of the aircraft towards the Y axis due to which the 2A wingtips rotate in the opposite directions. Further, based on the amount of hand movement of a user on the radio or the transmitter's knob through some angle, a desired angle is set so that the desired angle is equal to the same angle through which the hand of the user is moved and the wing tip device is moved by the same amount in opposite directions.

The adjustment of direction and the selection of servo motors related to 2A wingtips are performed by the control circuit of servo motors. The control circuit selects the respective two servo motors that are related to the wing tips 2A based on a command of the user. The control circuit outputs a command to the selected servo motors to regulate the operation of the servo motors so that the wing tips 2A arranged symmetrically on either side of a central axis are rotated in mutually opposite directions. The rotation rate is equal to both the wingtips due to which the lift force (L) will be equal and in opposite direction for both 2A wingtips and the two forces are neutralized each other and may not have a significant effect on the aircraft. The drag force (D) created by both 2A wingtips causes a downward force in the Z axis direction as shown in FIG. 6 and FIG. 7.

With respect to FIG. 7, The torque lever creates a torque M around the center of gravity of the unmanned aerial vehicle based on the downward force to tilt and rotate the aircraft around X axis. The thrust vector T is then broken into two vectors namely T1 and T2. The vector T1 overcomes the weight force of the aircraft and the vector T2 pushes the aircraft along Y axis. Similarly the other wingtips of 2B, 2C and 2D are also operated based on the circumstances and the command from the user to direct the unmanned aerial vehicle to different points in the air.

The plurality of wing tip devices 104 are classified into three types of wing tip devices and the three types of wing tip devices are controlled by the respective servo motors to control yaw, pitch and roll movements. The plurality of wingtip devices 104 is responsible for performing four main tasks and functions. The tasks include propeller turbulent air flow regularization, VTOL control for yaw direction, VTOL control for roll direction and VTOL control for pitch direction. The three types of the wingtip devices 104 are a first wing type devices, a second wing type devices and a third wing type devices. There are totally 12 wingtip devices located around the hemispherical body and four of the wingtip devices are related to each of the first wing type devices, the second wing type devices and the third wing type devices.

The plurality of the wingtip devices 104 are installed around the hemispherical body to regulate and channelize a turbulent downward air flow due to a spinning propeller 108 and to prevent generation of an empty space below the air craft due to an induction of energetic vortices of propeller 108 thereby increasing the stability of the aircraft. The plurality of the wingtip devices 104 and the hemispherical body provide an aerodynamic combination to increase a dynamic stability of the aircraft during a calm air of environment as well as during the landing and take-off operations and in static conditions. The curve of the hemispherical body 102 is designed in a way to keep a balance and a stability of the aircraft to provide a flight with more stable dynamics.

The control system regulates an operation of the plurality of the servo motors to change the angle of the plurality of the wingtip devices 104 against a downward air flow of the propeller 108 to adjust the yaw, pitch and roll movements to stabilize and control the movement of the aircraft. Further there are 12 servo motors that are used to control the angle between the aircraft wingtips 104 and downward air flow of propeller 108. The user controls the movement of the aircraft in different directions using the radio transmitter.

The user transmits a command to the sensor for controlling the movement of the aircraft in different directions using the radio transmitter. The command is related to a change of angle against the downward air flow movement of the propeller 108 and the servo motors control the angle between the plurality of wingtip devices 104 and the downward air flow of the propeller 108. The movement of the aircraft in the Z axis or yaw maneuver control is performed by a closed loop mechanism. Further by creating the closed loop mechanism, there will be no need for the user to control the unmanned aerial vehicle through Z axis at every moment and this will be done by the closed loop mechanism and the piezoelectric gyroscope.

When a user desires to change the angle of the aircraft with respect to Z axis, the angle of wingtip devices is changed to the preferred angle to increase or reduce a torque or UAV rotation. The piezoelectric gyroscope gives the deflection command to the servomotors with a priority which is higher than a priority assigned to a command received from the user for changing the movement of the aircraft.

Figure 8:
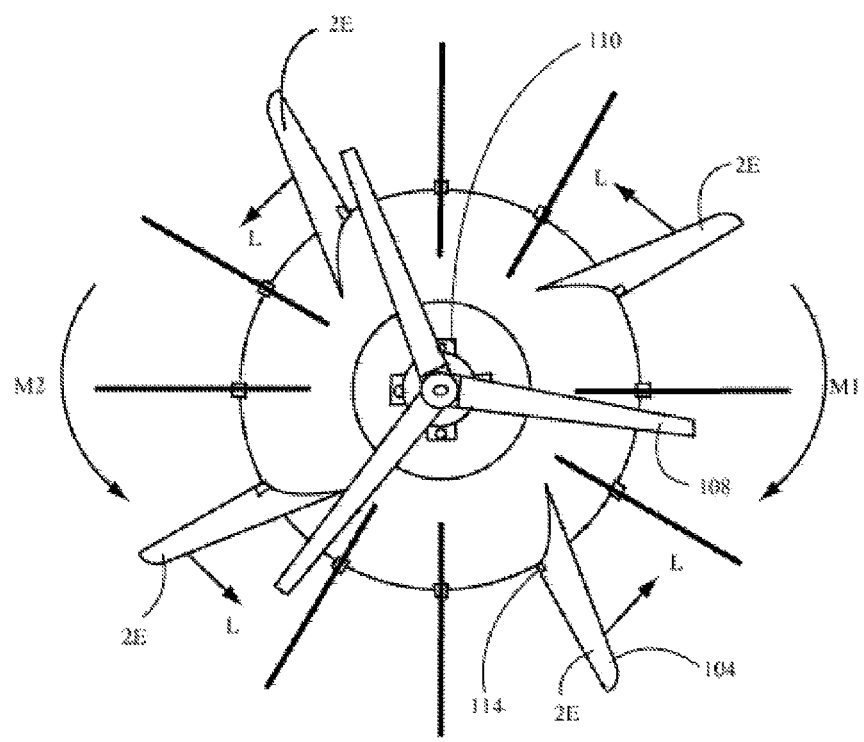
FIG. 8 illustrates a top side view of the plurality of wingtip devices in the unmanned aerial vehicle for controlling in Z axis or performing yaw maneuver, according to one embodiment herein.
Figure 9A:
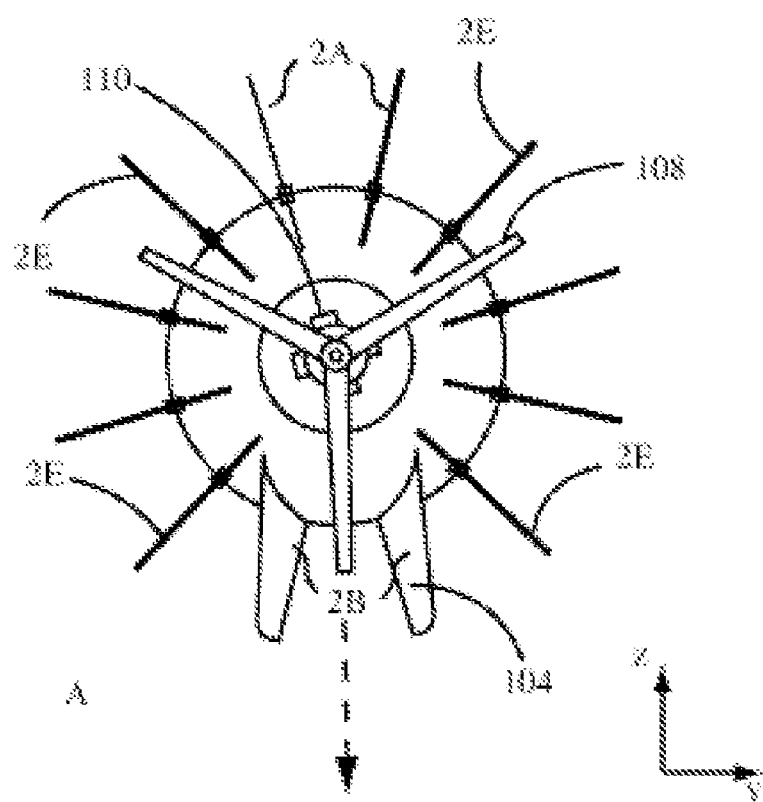
FIG. 9a-FIG. 9d illustrate a top side view of the plurality of wingtip devices in the unmanned aerial vehicle for controlling in X axis or pitch maneuver control and Y axis or roll maneuver control, according to one embodiment herein.
Figure 9B:
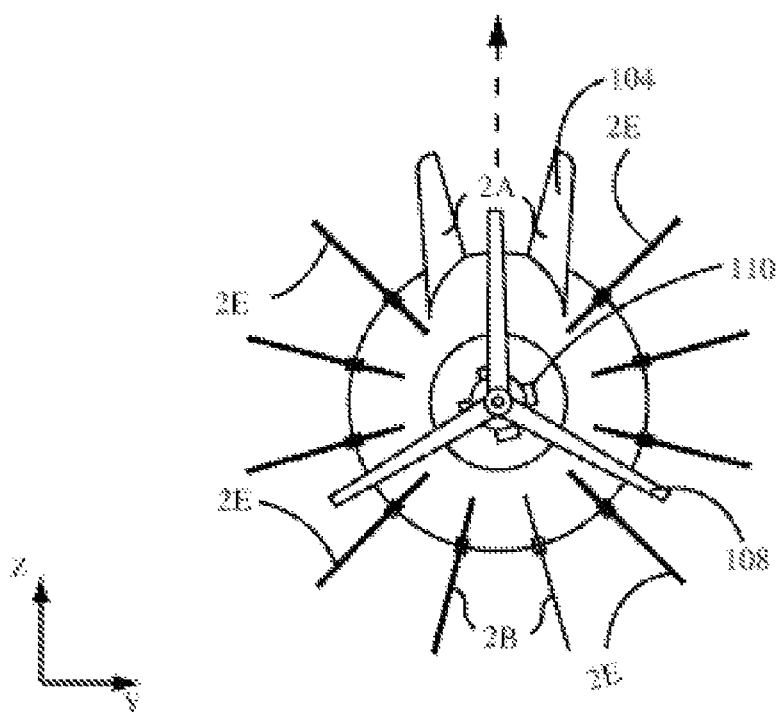
Figure 9C:
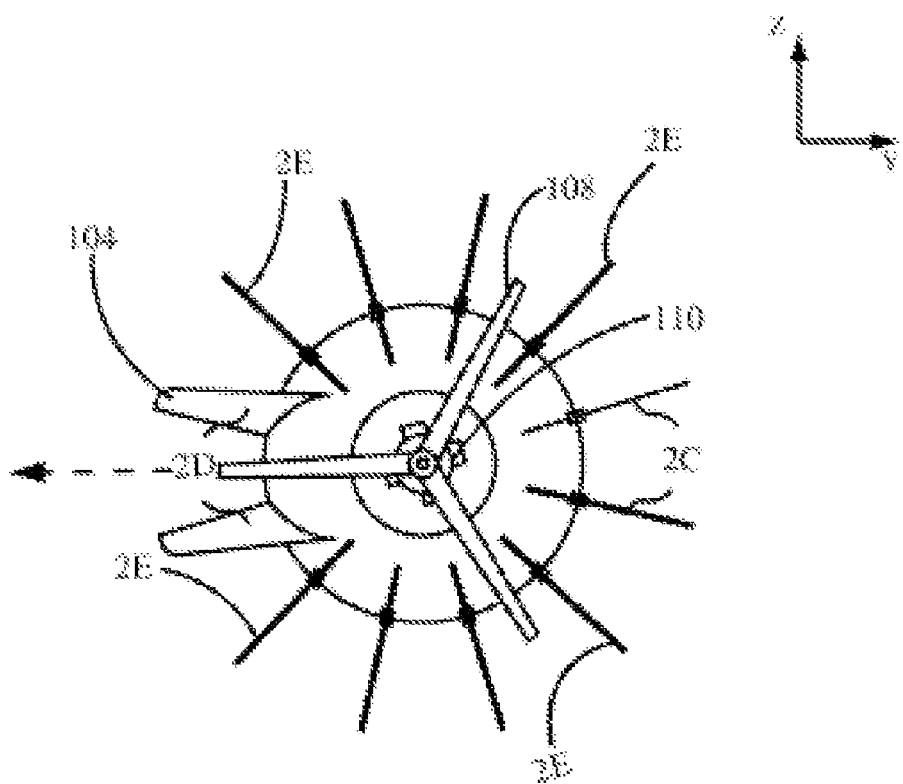
Figure 9D:
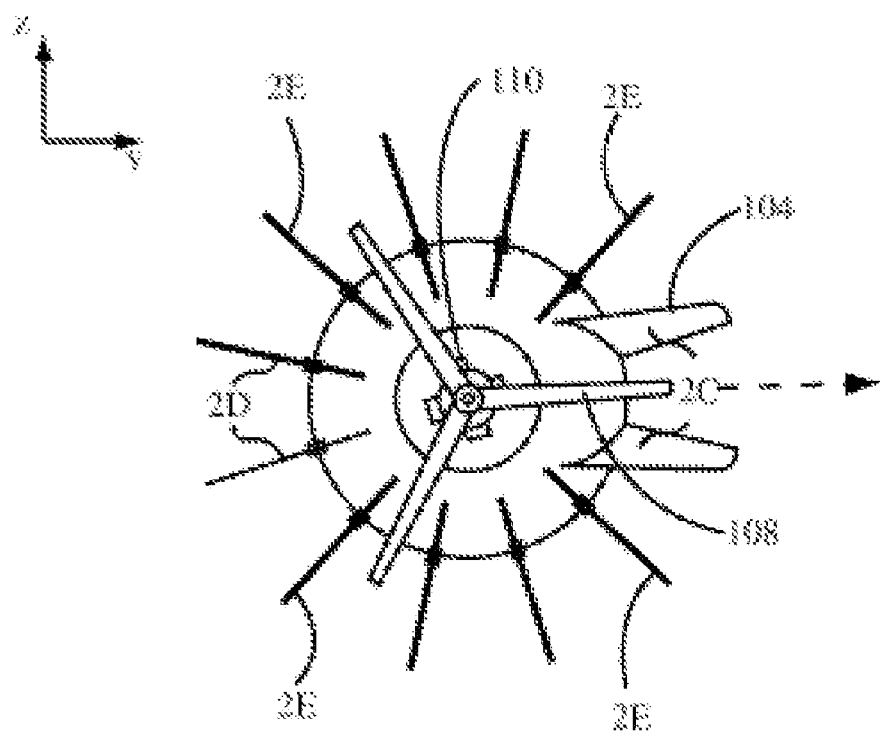

FIG. 8 illustrates a top side view of the plurality of wingtip devices in the unmanned aerial vehicle for controlling in Z axis or perform yaw maneuver, according to one embodiment herein, while FIG. 9a-FIG. 9d illustrate a top side view of the plurality of wingtip devices in the unmanned aerial vehicle for controlling in X axis or pitch maneuver control and Y axis or roll maneuver control, according to one embodiment herein. With respect to FIG. 8 and FIG. 9a-FIG. 9d, the control system regulates the operation of the servo motors to adjust the rotation of the plurality of the wing tip devices 104 in each of the three types of the wing tip devices. The rotation is adjusted so that the symmetrically arranged plurality of the wing tip devices 104 in each of the three types of the wing tip devices is rotated in mutually opposite directions. The three types of the wingtip devices are rotated in mutually opposite direction to equalize a torque of the brushless type electrical motor and for stabilizing a movement of the aircraft in a Z-axis as shown in FIG. 8.

The three types of the wingtip devices are a first wing type devices, a second wing type devices and a third wing type devices. The first wing type devices control a movement of the aircraft in the yaw direction, the second wing type devices control a movement of the aircraft in the roll direction and the third wing type devices control a movement of the aircraft in the pitch direction. The three types of wing tip devices have a plurality of wingtip devices 104 arranged symmetrically with respect to a central axis of the hemispherical body.

The four wingtips for yaw movement 2E control the angle around the vertical axis Z. The angle around the vertical axis Z is controlled by changing the angle ($\alpha$) of the wingtip devices 104 caused by the downward flow of air from the propeller 108. When the brushless type electromotor starts, the torque M1 generated from the motor function is exerted on the hemispherical body. The torque M1 generated in turn rotates the hemispherical body 102 in a direction opposite to the rotational direction of the propeller. The torque M1 generated from the brushless electrical type electromotor 106 is neutralized by the wingtips and a torque M2 is resulted from the operation. The aerodynamic lift (L) force created by the wingtip devices 104 is related to yaw motion control of the aircraft. Further by creating a torque M2 which is equal to the torque M1 of engine, the movement of the aircraft around Z axis is controlled by neutralizing the torque.

The brushless type electrical motor 106 directs the aircraft to an appropriate height by decreasing or increasing the rotation (rpm) of the electrical motor. The electromotor also regulates the thrust force. The piezoelectric gyroscope and the one or more servo motors connected to the 2E wingtips control the movement of the aircraft in unwanted directions around the Z axis. The movement of the aircraft in unwanted directions is caused due to a sudden increase in the lifting force of the propeller 108.

The yaw, pitch and roll movement of the aircraft are indicated using arrows as shown in FIG. 9a-FIG. 9d. The control system regulates an operation of the plurality of the servo motors to changes an angle of the plurality of the wingtip devices 104 against a downward air flow of the propeller 108 to adjust the yaw, pitch and roll movements to stabilize and control the movement of the aircraft. The control system is operated based on the symmetry of configuration and a movement of the plurality of wingtip devices 104 due to which the operation and the movement of the aircraft around X axis and Y axis remains the same.

Figure 10:
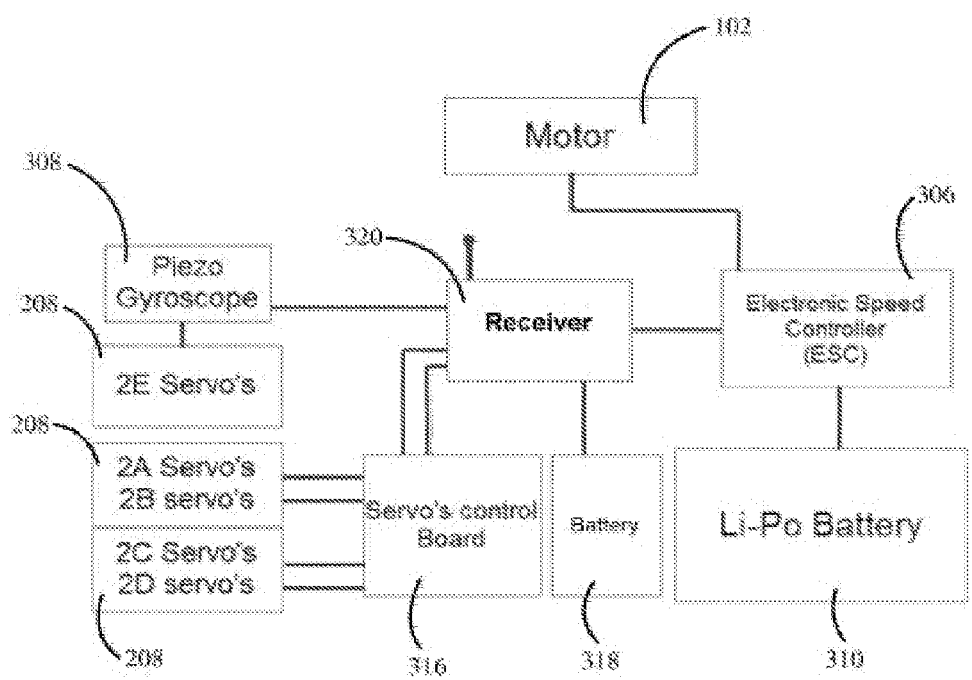
FIG. 10 illustrates a block circuit diagram of a control system in the unmanned aerial vehicle, according to one embodiment.

FIG. 10 illustrates a block diagram of subsystems in the unmanned aerial vehicle, according to one embodiment. With respect to FIG. 10, the subsystems in the unmanned aerial vehicle includes the brushless type electric motor 102, the radio receiver and antenna 320, the electronic speed controller 306, a lithium battery 310, a battery 318 for the radio receiver 320, the control circuit for directional servo motors 316, the piezoelectric gyroscope 308 and the plurality of servo motors 208.

The radio receiver 320 receives the command from the user and then transmits the command to other components. The radio receiver 320 receives a power from the battery 318. The rotation speed controller 306 directs the aircraft to an appropriate height by decreasing or increasing the rotation (rpm) of the motor and is connected to the brushless type electrical motor 102. The rotation speed controller 306 receives the power from the lithium polymer battery 310. The control circuit off the servo motors 316 is used to control the movement of the aircraft in yaw, pitch and roll directions.

When the user desires the aircraft to be moved about the positive direction of Y-axis, then the user receives the command and transmits it to the control circuit 316 of the servo motors 208. Further based on user's command, the servo motors 208 move towards one side of the aircraft such as the positive side of Y-axis. While the servo motors 208 are fixed on the opposite side of the aircraft such as negative side of Y-axis. The aircraft moves towards the positive direction on the Y-axis and blocks the piezoelectric gyroscope 308 heading indicators.

When the user desires to rotate the aircraft around Z-axis, then the command is sent to the piezoelectric gyroscope 308 which in turn transfers the command to the servo motors 208 that are directly related to the yaw motion and causes the craft to rotate around Z axis. The command is transferred to the respective servo motors that are related to the movement of the aircraft in yaw, pitch, and roll directions. The respective servo motors are 2A, 2B, 2C, 2D and 2E servos 208.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An unmanned aerial vehicle comprising:
a hemispherical body;
a brushless type electrical motor mounted on top of the hemispherical body;
a propeller attached to the brushless type electrical motor;
a plurality of wingtip devices arranged around the hemispherical body;
a plurality of servo motors connected to the plurality of the wingtip devices and wherein each of the plurality of the servo motors is connected to each of the plurality of the wingtip devices respectively;
a control system to regulate an operation of the plurality of the servo motors;
a plurality of carbon rods attached to the hemispherical body to protect the plurality of the wingtip devices from a damage during a take-off and a landing operation; and
a casing arranged inside the hemispherical body to accommodate the control system, a surveillance unit, a radio receiver, a battery unit for the radio receiver, a lithium polymer battery, a piezoelectric gyroscope, a rotation speed control motor and a battery for the surveillance unit;
wherein the brushless type electrical motor provides a lifting force for a vertical take-off and landing (VTOL) and wherein the plurality of wing tip devices are classified into three types of wing tip devices and wherein three types of wing tip devices are controlled by the respective servo motors to control yaw, pitch and roll movements thereby stabilizing and controlling the movement of the aerial vehicle.

2. The unmanned aerial vehicle according to claim 1, wherein the first wing type devices control a movement of the aircraft in a yaw direction, the second wing type devices control a movement of the aircraft in a roll direction and the third wing type devices control a movement of the aircraft in a pitch direction.

3. The unmanned aerial vehicle according to claim 1, wherein the control mechanism regulates an operation of the plurality of the servo motors to changes an angle of the plurality of the wingtip devices against a downward air flow of the propeller to adjust the yaw, pitch and roll movements to stabilize and control the movement of the aerial vehicle.

4. The unmanned aerial vehicle according to claim 1, wherein the piezoelectric gyroscope accommodated in the casing provides a deflection command to the servo motors.

5. The unmanned aerial vehicle according to claim 1, wherein the control system is operated based on a symmetry of configuration and a movement of the plurality of wingtip devices.

6. The unmanned aerial vehicle according to claim 1 further comprising a sensor located in the casing to receive an input from a user to output a commands to the control system to regulate the operation of the servo motors to adjust the movement of the plurality of the wing tip devices to control the yaw, pitch and roll movements of the aerial vehicle.

7. The unmanned aerial vehicle according to claim 6, wherein the user transmits the command to the sensor for controlling the movement of the aerial vehicle in different directions using the radio transmitter.

8. The unmanned aerial vehicle according to claim 6, wherein the command is related to a change of angle against the downward air flow movement of the propeller.

9. The unmanned aerial vehicle according to claim 1, wherein the servo motors control the angle between the plurality of wingtip devices and the downward air flow of the propeller.

10. The unmanned aerial vehicle according to claim 1, wherein the brushless type electric motor directs the aerial vehicle to an appropriate height by decreasing or increasing a rotational speed of the electromotor.

11. The unmanned aerial vehicle according to claim 1, wherein the surveillance unit accommodated in the casing is a visual surveillance camera.

12. The unmanned aerial vehicle according to claim 1, wherein the casing further comprises a video transmitter and an antenna.

13. The unmanned aerial vehicle according to claim 1, wherein the casing comprises a global positioning system.

14. The unmanned aerial vehicle according to claim 1, wherein the piezoelectric gyroscope accommodated in the casing gives the deflection command to servomotors with a priority which is higher than a priority assigned to the command received from a user for changing the movement of the aerial vehicle.

15. The unmanned aerial vehicle according to claim 1, wherein each of the three types of wing tip devices has a plurality of wingtip devices arranged symmetrically with respect to a central axis of the hemispherical body.

16. The unmanned aerial vehicle according to claim 1, wherein the control system regulates the operation of the servo motors to adjust the rotation of the plurality of the wing tip devices in each of the three types of the wing tip devices so that the symmetrically arranged plurality of the wing tip devices in each of the three types of the wing tip devices are rotated in mutually opposite directions to equalize a torque of the brushless type electrical motor to stabilize a movement of the aerial vehicle in a Z-axis.

17. The unmanned aerial vehicle according to claim 1, wherein a curve of the hemispherical body is designed in a way to keep a balance and a stability of the aerial vehicle to provide a flight with more stable dynamics.

18. The unmanned aerial vehicle according to claim 1, wherein the plurality of the wingtip devices are installed around the hemispherical body to regulate and channelize a turbulent downward air flow due to the spinning propeller and to prevent an empty space below the aerial vehicle due to an induction of energetic vortices of the propeller thereby increasing the stability of the aerial vehicle.

19. The unmanned aerial vehicle according to claim 1, wherein the plurality of the wingtip devices and the hemispherical body provide an aerodynamic combination to increase a dynamic stability of the aerial vehicle during a calm air of environment as well as during the landing and take-off operations and in static conditions.

* * * * *